United States Patent [19]
Nitsche et al.

[11] Patent Number: 4,872,179
[45] Date of Patent: Oct. 3, 1989

[54] LASER APPARATUS WITH A MULTIPASS RESONATOR

[75] Inventors: Rainer Nitsche, Offenbach; Bruno Sebralla, Bruchköbel; Rolf Malkmus, Hanau, all of Fed. Rep. of Germany

[73] Assignee: W. C. Heraeus GmbH, Hanau, Fed. Rep. of Germany

[21] Appl. No.: 283,786

[22] Filed: Dec. 13, 1988

[30] Foreign Application Priority Data

Apr. 26, 1988 [DE] Fed. Rep. of Germany ....... 3813951

[51] Int. Cl.$^4$ ...................... H01S 3/081; H01S 3/098
[52] U.S. Cl. ........................................ 372/93; 372/19; 372/99; 372/103; 372/107; 372/108
[58] Field of Search .................. 372/93, 94, 92, 99, 372/19, 103, 107, 108

[56] References Cited
U.S. PATENT DOCUMENTS 3,824,488  7/1974  Aleksoff .............................. 372/93
3,904,983  9/1975  Moreno et al. ..................... 372/103
4,686,685  8/1987  Hoag .................................... 372/107
4,703,491 10/1987  Lim ...................................... 372/107

FOREIGN PATENT DOCUMENTS 3515679  9/1986  Fed. Rep. of Germany .
0076580  4/1987  Japan .................................. 372/103

Primary Examiner—William L. Sikes
Assistant Examiner—Georgia Y. Epps
Attorney, Agent, or Firm—Felfe & Lynch

[57] ABSTRACT

A laser device includes a multipass resonator which has, in the beam path between two resonator end mirrors, at least two opposite beam folding mirrors with confronting mirror surfaces. At least one of the beam folding mirrors is limited in its width and at least one has a beam discharge area. To produce a low-order laser mode, preferably a 00 mode, the mirror surface of at least one beam folding mirror has its reflectivity dimimished in the region outside of the desired modes of radiation.

6 Claims, 1 Drawing Sheet

LASER APPARATUS WITH A MULTIPASS RESONATOR

BACKGROUND OF THE INVENTION

The invention relates to a laser apparatus with a multipass resonator. In the beam path between two resonator end mirrors, such a laser has at least two beam folding mirrors with confronting mirror surfaces, at least one of which is limited in its width and at least one of the beam folding mirrors has a beam discharge area.

A laser with multipass resonator is disclosed, for example, in German Patent No. 35 15 679. This laser has an internal electrode which is coaxially surrounded by a tubular external electrode. The annular space between the two electrodes is defined axially by two beam folding mirrors. Such multipass resonators have the advantage that a great resonator length can be achieved with a short length of the laser, since the beam is repeatedly reversed between the beam folding mirrors. What is problematical in such resonators is the adjustment of the two mirrors to one another and the precise creation of the individual reflective surfaces on the beam folding mirrors which are spherical mirrors, such that the laser beam will be reflected between the two mirrors without any great deviation.

Through the use of spherical beam folding mirrors, the individual points at which the laser beam strikes the beam folding mirrors are situated on a circle with the radius r or generally on an ellipse. The stability is insensitive to r, the magnitude of r is not defined. Since the beam folding mirrors are rotationally symmetrical, the position of the points of impingement is not established by the circumference, i.e., basically any number of modes can vibrate. What is desired, however, is a mode of a low order, preferably a 00 basic mode. Even slight deviations from a precise adjustment will cause the beam to be reflected undefined at the mirror surfaces and thus undesired modes can be excited. To suppress undesired modes, it is common practice to provide mode masks in the form of bored disks as additional components in front of the beam folding mirrors, which permit the beam to strike only on predetermined areas of the beam folding mirror.

In a multipass resonator the laser beam strikes the beam folding mirror at a slight angle. To obtain a circular mode the mark must accordingly have a corresponding contour or must be as near as possible to the reflective surfaces, and cannot be positioned at any desired point in the resonator as it can in the case of a nonfolded resonator.

A disk with holes, as used for the known lasers with multiplass resonators, has the disadvantage that the surfaces of the mirror can be damaged by its installation. Also the intense radiation can vaporize material from the mask onto the mirror surfaces.

SUMMARY OF THE INVENTION

It is the object of the present invention to devise a laser apparatus with a multipass resonator of the type described above which will produce a low-order laser mode, preferably a 00 mode, and which will avoid the disadvantages pointed out above.

This object is achieved by the invention by the fact that, to mask out undesired radiation modes, the mirror surface of at least one beam folding mirror is reduced in its reflectivity outside of the desired radiation modes. The surface of the mirror is configured such that only those surface areas will reflect which are illuminated by the required mode. The mode mask is thus made directly in or on the mirror surface, so that no separate components are necessary. The mode mask can be produced by the mechanic shaping of the mirror surface, so that damage to the mirror surface by the installation of a mode mask is virtually impossible. The reduction of the reflectivity of the mirror surface can be accomplished by roughening the surface of the mirror body. For this purpose the reflective surface is covered when it is being made and the mirror body is etched or sandblasted. In like manner, a coating that reduces reflectivity can be applied to the areas of the mirror body which define the modes. Depending on the distance between the individual reflective surfaces of a beam folding mirror, the possibility exists of providing bores in the areas not serving for reflection. If the individual reflection surfaces are substantially circular mirror surfaces which are very close together, it may be sufficient to drill blind holes on either side of the center line.

The possibilities described above for making the mode masks according to the invention are not limited just to multipass resonators with the electrodes in a coaxial arrangement, but they can also be carried out on mirrors for multipass resonators in which the beam is folded repeatedly in one plane.

Additional details and features of the invention will be found in the following description of an embodiment in conjunction with the accompanying drawings.

DESCRIPTION OF THE PREFERRED EMBODIMENTS

Figure 1:
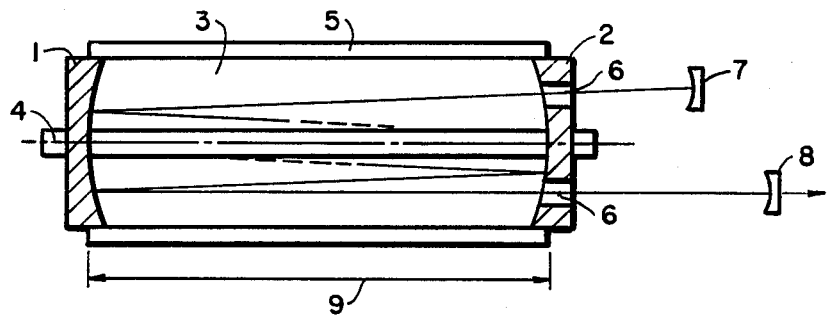
FIG. 1 represents schematically a laser apparatus with a multipass resonator having its electrodes in a coaxial arrangement.

The laser apparatus, as shown in FIG. 1, has two multipass mirrors 1 and 2 which define the excitation chamber 3 that is formed between an internal electrode 4 and an external electrode 5 disposed coaxially with the internal electrode and spaced away from the latter. The right-hand mirror of the two multipass beam folding mirrors 1 and 2 has two openings 6 behind each of which there is disposed a resonator end mirror 7 and 8. The resonator end mirror 8 is partially transparent to the radiation. The length of a multipass resonator of this kind is determined by the length of the beam between the two resonator end mirrors 7 and 8; i.e., by the sum of lengths 9 of the individual passes of the beam between the two multipass mirrors 1 and 2 and the distance of the two resonator end mirrors 7 and 8 from the multipass mirror 2.

Figure 2:
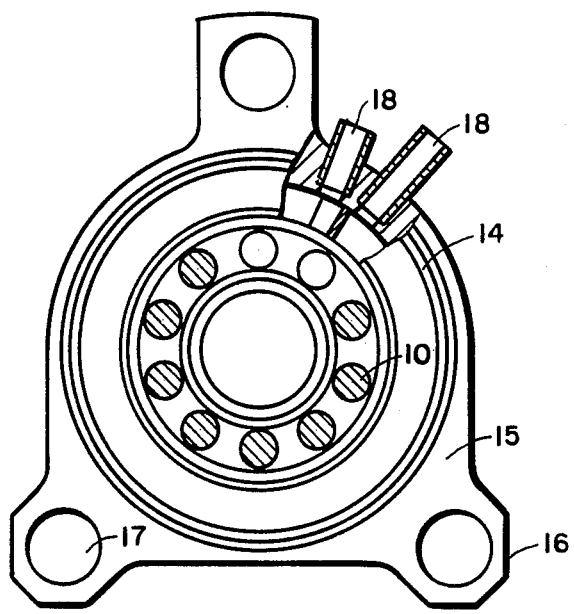
FIG. 2 represents a beam folding mirror such as is usable, for example, in the arrangement of FIG. 1.
Figure 3:
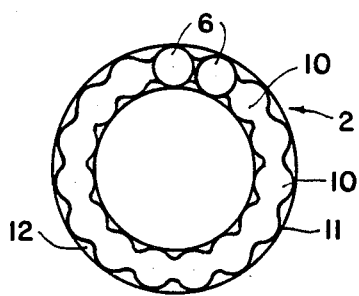
FIG. 3 shows the annular mirror surfaces of the two beam folding mirrors of the arrangement of FIG. 1, provided with mode masks according to one embodiment of the invention.
Figure 4:
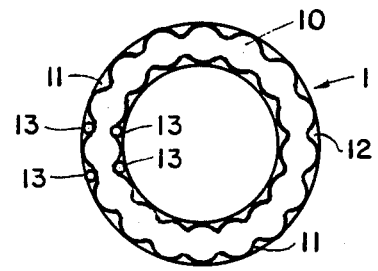
FIG. 4 shows the annular mirror surfaces of the two beam folding mirrors of the arrangement of FIG. 1, provided with mode masks according to another embodiment of the invention.

The mirror surfaces of the two multipass mirrors 1 and 2 are annular spherical surfaces, as shown in FIGS. 2 to 4. The beam runs from the one resonator end mirror 7 through the one opening 6 and from there back and forth through the annular space 3 between the individual mirror surfaces 10 to the end mirror 8. The individual mirror surfaces 10 are, in accordance with FIGS. 3 and 4, situated very close together, while in FIG. 2 the mirror surfaces 10 are farther apart. Both on the outside and on the inside of the annular mirror surface, areas remain, indicated by the contour lines 11, which are outside of the desired modes. These areas 12 are roughened, so that the reflective properties are substantially reduced in those areas. In the radial direction the mirror surfaces 10 are already limited by the width of the annular surface. Areas 12 can also be milled out, so that they are substantially recessed from the mirror surfaces 10. Such recesses can be made in the mirror blank before polishing.

In FIG. 4, individual blind holes 13 are indicated in the left half of the multipass mirror 1, in the boundary area between each pair of adjacent mirror surfaces 10, which can be provided instead of the roughened areas 12 and are already sufficient in some cases to make the laser vibrate only in low modes.

The mirror, as it can be seen in FIG. 2, has a mirror body 14 which is fastened to a flange 15. The flange 15 has three mounting projections 16 with holes 17 through which Invar rods, not shown, are passed for the purpose of mounting the beam folding mirrors and end mirrors on these Invar rods. Furthermore, coolant inlet and outlet connections 18 are provided for the cooling of the mirror body 14. The annular face of this mirror has individual mirror surfaces 10 which are distributed at a relatively great distance from one another.

There has thus been shown and described a novel laser apparatus with a multipass resonator which fulfills all the objects and advantages sought therefor. Many changes, modifications, variation and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention which is limited only by the claims which follow.

What is claimed is:

1. In a laser apparatus with a multipass resonator, which has in the beam path between two resonator end mirrors at least two oppositely lying beam folding mirrors with mirror surfaces facing one another, of which at least one is limited in its width and at least one has a beam discharge area, the improvement wherein the mirror surface of at least one of the beam folding mirrors is reduced in its reflectivity in the region outside of desired modes of radiation thereby to mask out undesired modes of radiation.

2. The laser apparatus according to claim 1, wherein the areas of diminished reflectivity are formed by roughened surfaces.

3. The laser apparatus according to claim 1, wherein the areas of diminished reflectivity are formed by reflection-reducing coatings.

4. The laser apparatus according to claim 1, wherein the areas of diminished reflectivity are formed by a plurality of holes.

5. The laser apparatus according to claim 4, wherein the holes are blind holes.

6. The laser apparatus according to claim 1, wherein the mirror area of at least one beam folding mirror is composed of a plurality of substantially circular mirror areas.

* * * * *